F. CONLIN.
MARINE TORPEDO.
APPLICATION FILED MAY 29, 1915.
1,348,152.
Patented Aug. 3, 1920.
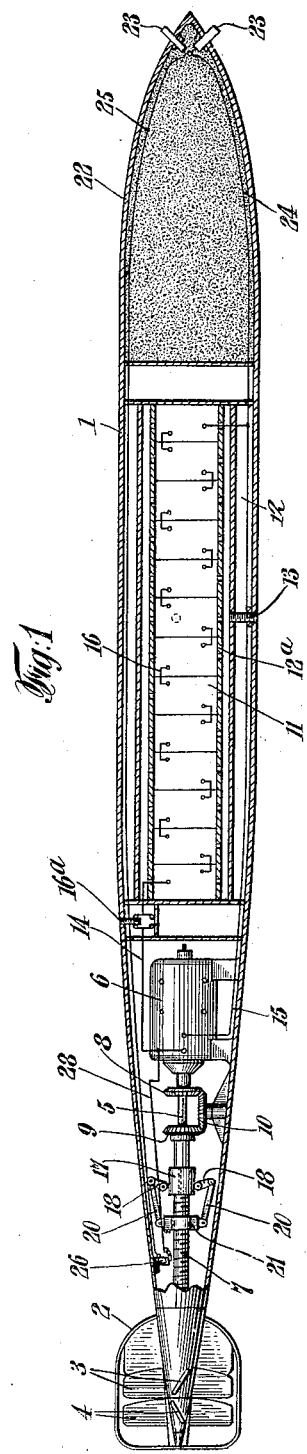
INVENTOR
Frederick Conlin
BY
ATTORNEYS

UNITED STATES PATENT OFFICE.

FREDERICK CONLIN, OF ELIZABETH, NEW JERSEY.

MARINE TORPEDO.

1,348,152.  Specification of Letters Patent.  Patented Aug. 3, 1920.

Application filed May 29, 1915. Serial No. 31,125.

*To all whom it may concern:*

Be it known that I, FREDERICK CONLIN, of Elizabeth, in the county of Union and in the State of New Jersey, have invented a certain new and useful Improvement in Marine Torpedoes; and do hereby declare that the following is a full, clear, and exact description thereof.

My invention relates to torpedoes used for marine purposes, as for example, torpedoes adapted to be discharged against a ship or other object in the water to destroy or damage the same. In general, my invention relates to an improvement in torpedoes of the type known as "Whitehead" torpedoes.

Formerly, torpedoes of this type, that is to say, of the "Whitehead" type have been extremely expensive owing to the mass of mechanism contained within the same. The weight is an important factor, as the number of torpedoes that can be carried by a single submarine is largely determined by this factor.

The object of my invention is to provide a torpedo of this type, which may be constructed at a lower cost than previous torpedoes of this type, and which is free from the extreme complexity of such former torpedoes. Further objects of my invention will appear from a consideration of the detailed description appearing hereinafter.

While my invention is capable of embodiment in many different forms, for the purpose of illustration I have shown only one form thereof in the accompanying drawings, in which, Figure 1 is a diagrammatic representation of a torpedo partly in section made in accordance with my invention;

Fig. 2 is a plan view of an enlarged detail of the same; and

Fig. 3 is a section of another form of brake.

In the drawings I have shown a torpedo casing 1, having at the rear thereof a guard 2 for a forward propeller 3, and a rear propeller 4, which are adapted to be rotated in opposite directions, and which, therefore, are made in the shape of right and left-handed screws. The rear propeller 4 is located on a main motor shaft 5, connected to an electric motor 6, while the forward propeller 3 is located on a sleeve 7 through which the main shaft 5 passes, the main shaft 5 and the sleeve 7 being geared together by beveled gears 8 and 9 located on the shaft and sleeve respectively and constructed to operate together in opposite directions by means of an intermediate gear 10 on a stud shaft connected to the casing 1. The electric motor 6 is driven from any suitable source of power, as for example, a series of primary or secondary batteries 11 located in the central portion of the torpedo. I prefer, however, to use a primary battery, since this type of cell, although heavy in proportion to the amount of energy developed when designed for discharge over a long period of time, will furnish the amount of power required for the torpedo with a very much reduced weight of battery when designed to discharge during such a short time as the period of travel of a torpedo. Where the batteries 11 are storage batteries they may be charged with current shortly before the torpedo is intended to be used. Where, however, they are primary batteries they may either be arranged with the liquid electrolyte present therein, or in such a way that the electrolyte, as for example, sulfuric acid is contained in a chamber 12, located at the sides of the batteries 11, and arranged to supply the electrolyte to the batteries 11 when one of the screw plugs 13 is unscrewed to uncover an opening between the chamber 12 and a perforated partition 12$^a$ communicating with the series of batteries 11. In fact, the latter arrangement is preferred. Current is conveyed to the motor 6 by means of wires 14 and 15 from the two ends of the series of batteries 11, while the batteries 11 themselves are connected together by wires 16. The wire 14 is preferably interrupted to require the insertion of a screw plug 16$^a$ in order to complete the circuit through the motor 6 prior to the discharge of the torpedo into the water. In order to prevent the propellers 3 and 4 racing before the torpedo is discharged into the water, and after the source of power is applied in the torpedo, I provide a brake 17 consisting of a split sleeve located around the sleeve 7, which brake is adapted to be operated by bell crank levers 18, pivoted on shafts 19 to the casing 1. These bell crank levers 18 are provided with eccentrics 19$^a$, which bear against the faces of the split sleeve 17 and arms 18 which are pivoted to links 20, the other ends of which are connected to a collar 21, screw-threaded on to the sleeve shaft 7. As the sleeve 7 begins to rotate the screw-threaded collar 21 is moved toward the rear of the torpedo thus applying the brake 17 and lowering the speed of rotation of the sleeve 7 and the shaft 5. However, as the screw-threaded collar 21 advances along the sleeve 7, the pressure on the brake 17 is released, thus allowing the full power of the apparatus to be used in the rotation of the shaft 5 and sleeve 7 at a relatively high speed. The torpedo is provided with a body of explosive 22, at its forward end which is adapted to be exploded by pins or plungers 23 located at the forward end of the torpedo when the same come in contact with the object to be destroyed by closing a circuit between a wire 24 leading from the wire 15, and a wire 25 leading from a contact 26 sufficiently to cause a spark in the circuit, as for example, at the pin 23. The circuit through the contact 26 is adapted to be closed only when the collar 21 has been rotated by the sleeve 7 sufficiently to bring the collar 21 into contact therewith, that is to say, when the torpedo is in the water and before it reaches the end of its intended path. When so completed the current passes from the contact 26 through the collar 21 and into the sleeve 7, from which the current passes by a wire 28 to the wire 14 connected to the other terminal battery. It is to be understood, of course, that any other suitable controlling devices, such as are used in torpedoes of this type, may be applied to or contained within the torpedoes made in accordance with my invention. The batteries and motor may be of any desired type. As previously stated, however, a primary battery is preferred, it being understood that the battery should be of such a nature as to give out its current very rapidly, that is to say, in approximately the period which it is desired for the torpedo to run before its destruction. Furthermore, a series wound motor is preferred, as it occupies the least space for a given power, weight and efficiency. It is to be understood, however, that a compound or shunt motor may be used, if desired.

In Fig. 3 I have shown a modified form of brake which may be used to advantage in the torpedo. This form of my invention is constructed the same as the form shown in Figs. 1 and 2, except that instead of the brake mechanism shown therein, I make use of a resistance coil 29 having a plurality of contacts 30 along the coil to coöperate with a sliding sleeve 31 having a metallic rim 32 supported upon an insulating ring 33, said sleeve 31 being screw-threaded on the screw-threaded sleeve 7. The ring 32 is adapted also to make contact with a stationary contact 34. The stationary contact 34 and the resistance coil 29 are connected by wires 35 and 36 respectively to the batteries 11.

While I have described my invention above in detail, I wish it to be understood that many changes may be made therein without departing from the spirit of my invention.

I claim:

1. A marine torpedo having an electric current as its source of power, a propeller, an electric motor for driving the same, and means for preventing the high speed of the propeller when the same begins to rotate.

2. A marine torpedo having an electric battery within the torpedo as its source of power, a propeller, an electric motor for driving the same, and means for preventing the high speed of the propeller when the same begins to rotate.

3. A marine torpedo having an electric primary battery within the torpedo as its source of power, a propeller, an electric motor for driving the same, and means for preventing the high speed of the propeller when the same begins to rotate.

4. A marine torpedo having an electric current as its source of power, a propeller, an electric motor for driving the same, and means for preventing the high speed of the propeller when the same begins to rotate, comprising a brake automatically thrown out when the propeller has rotated a certain period of time.

5. A marine torpedo having an electric battery within the torpedo as its source of power, a propeller, an electric motor for driving the same, and means for preventing the high speed of the propeller when the same begins to rotate, comprising a brake automatically thrown out when the propeller has rotated a certain period of time.

6. A marine torpedo having an electric primary battery within the torpedo as its source of power, a propeller, an electric motor for driving the same, and means for preventing the high speed of the propeller when the same begins to rotate, comprising a brake automatically thrown out when the propeller has rotated a certain period of time.

7. A marine torpedo having an electric circuit for exploding the same, a rotating threaded shaft forming a part of said circuit, a contact in said circuit located adjacent said shaft, a threaded member engaging said shaft and movable along the shaft into engagement with said contact.

8. A marine torpedo having an electric circuit for exploding the same, a rotating threaded shaft forming a part of said circuit, a contact in said circuit located adjacent said shaft, an interiorly threaded collar inclosing said shaft and movable into engagement with said contact.

9. A marine torpedo having a propeller, and means for preventing the high speed of the propeller when the same begins to rotate.

10. A marine torpedo having a propeller, and means for preventing the high speed of the propeller when the same begins to rotate, comprising a brake automatically releasable when the propeller has rotated a certain period of time.

In testimony that I claim the foregoing I have hereunto set my hand.

FREDERICK CONLIN.

Witnesses:
MARIAN I. DEMPSEY,
EDWIN J. PRINDLE.